United States Patent [19]
Shinmyo

[11] Patent Number: 4,882,730
[45] Date of Patent: Nov. 21, 1989

[54] TDMA COMMUNICATION SYSTEM HAVING COMMON TIME SLOTS FOR SYSTEM MAINTENANCE

[75] Inventor: Saburo Shinmyo, Tokyo, Japan
[73] Assignee: NEC Corporation, Japan
[21] Appl. No.: 126,561
[22] Filed: Nov. 30, 1987

[30] Foreign Application Priority Data

Nov. 28, 1986 [JP] Japan .................................. 61-283694

[51] Int. Cl.⁴ ............................................... H04J 3/16
[52] U.S. Cl. ................................ 370/95.2; 370/104.1; 371/33; 340/825.08
[58] Field of Search ......................... 370/95, 96, 89, 90, 370/94, 94 U, 13, 104; 371/32, 33; 340/825.08

[56] References Cited

U.S. PATENT DOCUMENTS 4,352,183 8/1982 Davis et al. ............................ 371/33
4,716,408 12/1987 O'Connor et al. ....:................ 370/96

Primary Examiner—Joseph A. Orsino
Assistant Examiner—Frank M. Scutch, III
Attorney, Agent, or Firm—Laff, Whitesel, Conte & Saret

[57] ABSTRACT

A deman assignment TDMA communication system includes first and second time division multiplexed (TDM) transmitting channels for establishing a broadcast channel from the central station to the terminal stations and a pair of first and second TDM receiving channels for establishing channels from the terminal stations to the central station on an as needed basis. A polling circuit transmits a polling signal on a common time slot of the broadcast channel for polling the terminal stations and periodically shifting the polled station to the next to permit each of the terminal stations to send an acknowledgment to the central station on a common time slot of the established channels. A fault identification circuit is provided for detecting the presence and absence of the acknowledgment at the central station and determining therefrom the location of a fault. Switches are responsive to the output of the fault identification circuit for selectively coupling the outputs of the transmitting channels to the broadcast channel and selectively coupling the outputs of the receiving channels to a demultiplexer.

5 Claims, 3 Drawing Sheets

TDMA COMMUNICATION SYSTEM HAVING COMMON TIME SLOTS FOR SYSTEM MAINTENANCE

BACKGROUND OF THE INVENTION

The present invention relates to a demand assignment time division multiple access (TDMA) communication system, and more specifically to maintenance control for switching between duplicated channels and giving a fault indication in the event of a channel failure.

In a TDMA communication system, each of a plurality of terminal stations establishes communication with another via a central station, and so the equipment of the central station is commonly shared by all the terminal stations. Thus, an equipment failure in the central station would seriously affect on the total traffic of the whole system. To avoid system interruption, the central station equipment is duplicated to instantly switch the communication path to a standby channel in the event of a trouble in the active channel. This requires the constant monitoring of the working conditions of the duplicated channels.

Hitherto, in a preassignment TDMA system, the whole system is monitored by effecting error check on the information bits of each time slot. If the error rate of each time slot exceeds beyond a preset value, the active channel is regarded as being faulty and the system is switched to the standby channel. However, the time-slot monitoring approach of the preassignment TDMA system would require a costly, complicated monitoring system if it is employed in a demand assignment TDMA system because the time slots would have to be monitored on an individual basis for fault location.

SUMMARY OF THE INVENTION

It is therefore an object of the present invention to provide a demand assignment time division multiple access communication system which implements channel switching and fault locating functions in an economical manner.

This object is attained by exclusively using a common time slot for transmitting a polling signal to each terminal station and allowing each terminal station to send an acknowledgment on a common time slot in response to the polling signal.

More specifically, the system of the present invention comprises first and second time division multiplexed (TDM) transmitting channels for establishing a broadcast channel from the central station to the terminal stations and a pair of first and second TDM receiving channels for establishing channels from the terminal stations to the central station on an as needed basis. A polling circuit transmits a polling signal on a common time slot of the broadcast channel for polling the terminal stations and periodically shifting the polled station to the next to permit each of the terminal stations to send an acknowledgment to the central station on a common time slot of the established channels. A fault identification circuit is provided for detecting the presence and absence of the acknowledgment at the central station and determining therefrom the location of a fault. Switches are responsive to the output of the fault identification circuit for selectively coupling the outputs of the transmitting channels to the broadcast channel and selectively coupling the outputs of the receiving channels to a demultiplexer.

BRIEF DESCRIPTION OF THE DRAWINGS

The present invention will be described in further detail with reference to the accompanying drawings, in which.

DETAILED DESCRIPTION

Figure 1:
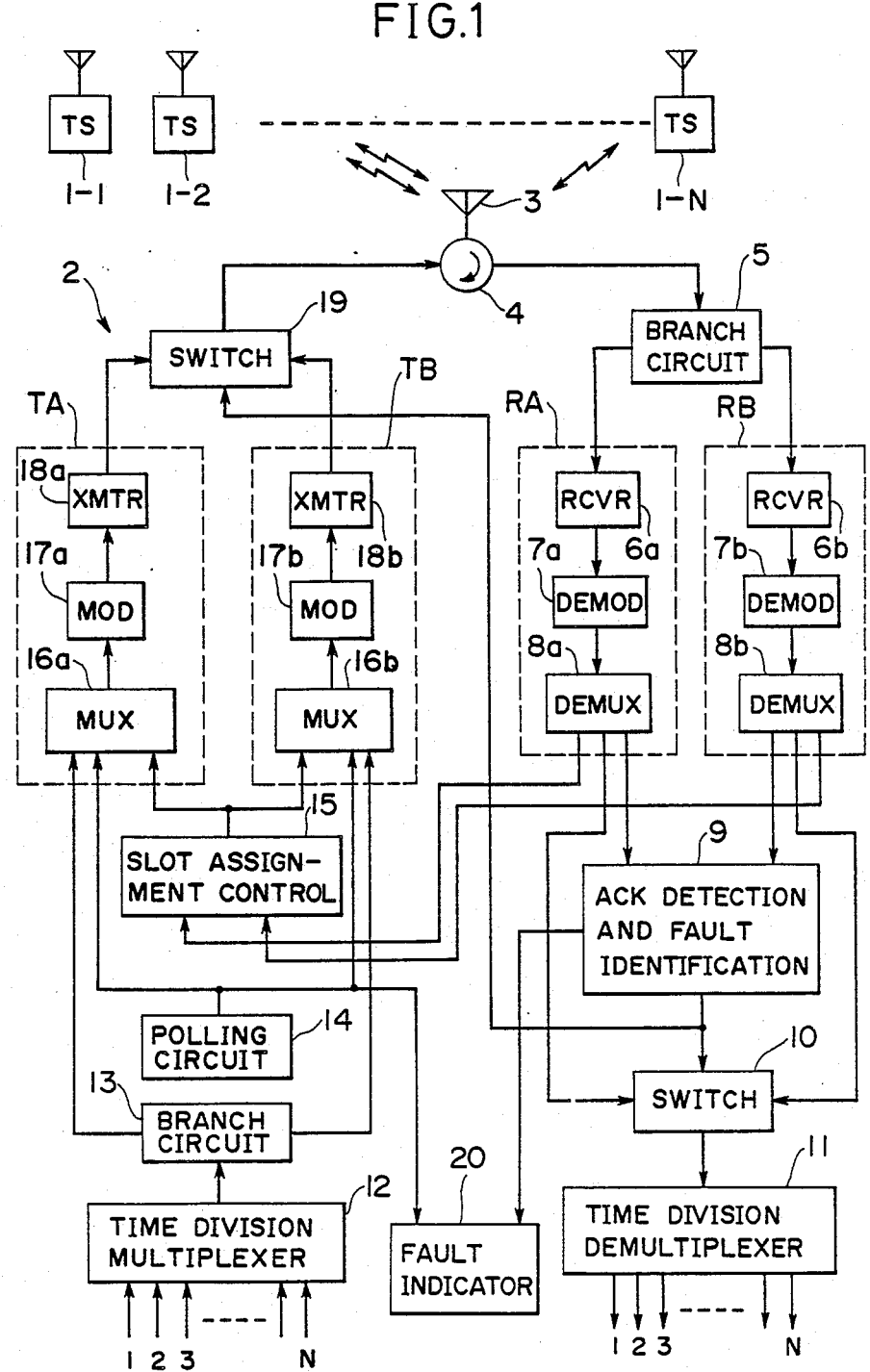
FIG. 1 is a block diagram of a demand assignment time division multiple access communication system embodying the channel switching and fault locating functions of the present invention.
Figure 2:
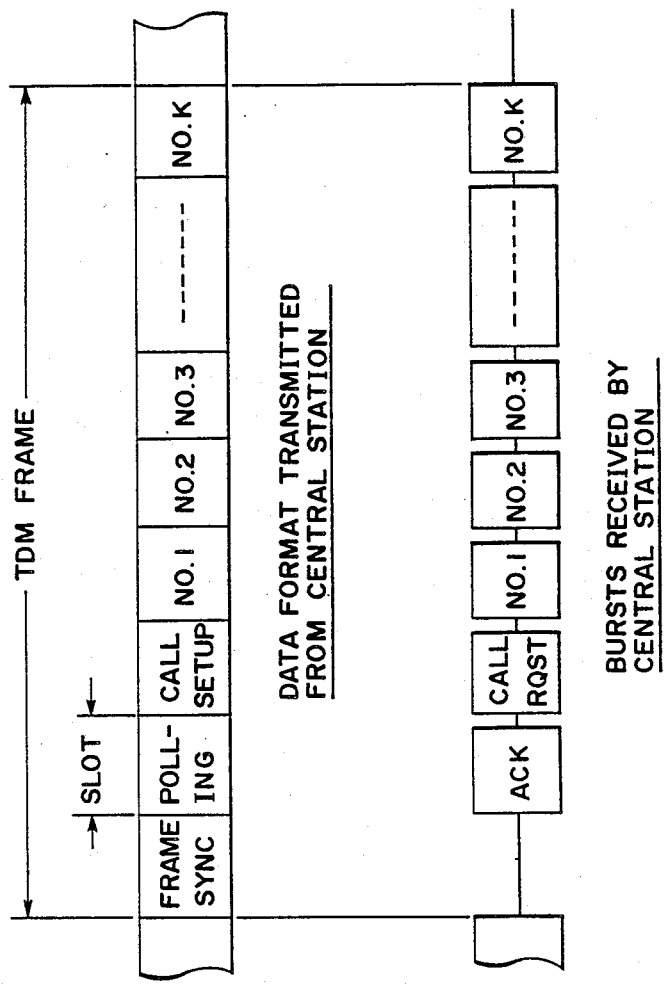
FIG. 2 is an illustration of a data format used for transmission from the central station and an illustration of a train of bursts transmitted from terminal stations on an as-needed basis.

In FIG. 1, a demand assignment TDMA (time division multiple access) communication system of the invention comprises a plurality of terminal stations 1-1, 1-2 ..... 1-N and a central station 2. The terminal stations establish communication to the central station on a time slot of a common radio channel specified by the central station on an "as needed" basis and the central station establishes communication to a destination terminal station by multiplexing time-divided signals on a broadcast channel. As illustrated in FIG. 2, the time-division multiplexed signal comprises a series of TDM frames each being partitioned into time slots of equal length. The first time slot of each TDM frame is occupied with a frame sync indicating the beginning of the frame. The second time slot is the dedicated time slot for system's maintenance purposes. This time slot is occupied with a polling signal containing the address of each terminal station to request it to return an acknowledgment in order to permit the central station to diagnose the system function in a manner as will be described. The third time slot contains address data for establishing a call from the central station to a source station and a time slot number for instructing it to send its information on the time slot specified by the slot number, or it contains address data for establishing a call from the central station to a destination station and a time slot number for instructing it to detect information destined to it from the time slot specified by the last-mentioned time slot number. The remainder is the data field which is partitioned into K time slots for carrying information from the central station to a maximum of K terminal stations, where K is smaller than N. Each terminal station is provided with a circuit that examines the second time slot of each TDM frame to see whether the polling signal is addressed to the own station, and if so, it proceeds to send an acknowledgment on the second time slot of TDMA bursts to be received by the central station. This acknowledgment includes the identification of the polled terminal station. The third time slot of the TDMA bursts is used for sending a call request signal from each terminal station to indicate its address and/or the address of a destination terminal station. The remainder of the burst train carries information bits on K time slots.

Returning to FIG. 1, transmission from each terminal station to the central station is received by antenna 3, fed through a duplexer 4 to a splitter 5 where it is split into identical signals which are fed respectively to identical receiving channels RA and RB which are duplicated.

Each of the receiving channels comprises a receiver 6, a demodulator 7 and a demultiplexer 8, all of which are connected in cascade from a respective output of the splitter 5. Demultiplexer 8 separates the acknowledgment and call request signals and information signals from the demodulated TDM output of demodulator 7 and supplies the acknowledgment signal to an acknowledgment detection and fault identification circuit 9 and the information signals to a respective input of a switch 10, the output of which is connected to the input of a time division multiplexer 11 where the information signals are demultiplexed and delivered to output ports 1 through N associated respectively to the terminal stations 1-1 through 1-N.

Information signals to be sent to terminal stations are supplied from input ports 1 through N of a time division multiplexer 12 where they are multiplexed into a TDM signal and supplied through a splitter 13 to identical transmitting channels TA and TB which are duplicated to associate with receiving channels RA and RB, respectively. Each transmitting channel includes a multiplexer 16, a modulator 17 and a transmitter 18, all of which are connected in cascade to a respective input of a switch 19, the output of which is connected to the duplexer 4.

A polling circuit 14 is provided to generate a polling signal at frame intervals and supplies it to the multiplexers 16a and 16b. The polling signal contains the address of a terminal station, the address being switched to the next terminal station at frame intervals. The polling signal is also supplied to a fault indicator 20 to allow it to give an indication of a faulty terminal station.

The call request signals separated by the demultiplexers 8a and 8b are supplied to a time slot assignment control circuit 15. In response to the call request from a terminal station, the time slot assignment control circuit 15 selects an idle time slot in the data field of TDM frame and supplies a slot number signal to the multiplexers 16a and 16b indicating the selected time slot. Each multiplexer 16 multiplexes the input signals applied thereto to form a TDM frame as shown in FIG. 2. After modulation by modulator 17, the TDM frame is applied to the respective input of switch 19.

One of the receiving channels RA and RB is said to be active when the output of this channel is utilized for demultiplexing and the other is said to be in a hot-standby state with its output being simply discarded. Likewise, transmitting channel TA or TB is said to be active when the output is utilized for transmission and is said to be in a hot-standby state when the output is simply discarded. Receiving channels RA and RB are active in association with transmitting channels TA and TB, respectively. When a faulty condition is detected in the active transmitting or receiving channel, switches 10 and 19 are simultaneously operated to switch the standby transmitting and receiving channels into operation. Specifically, switches 10 and 19 are controlled by the output of ACK detection and fault identification circuit 9. When transmitting channel TA is active, the output of this channel is applied to duplexer 4, and the output of the receiving channel RA is applied to demultiplexer 11.

Figure 3:
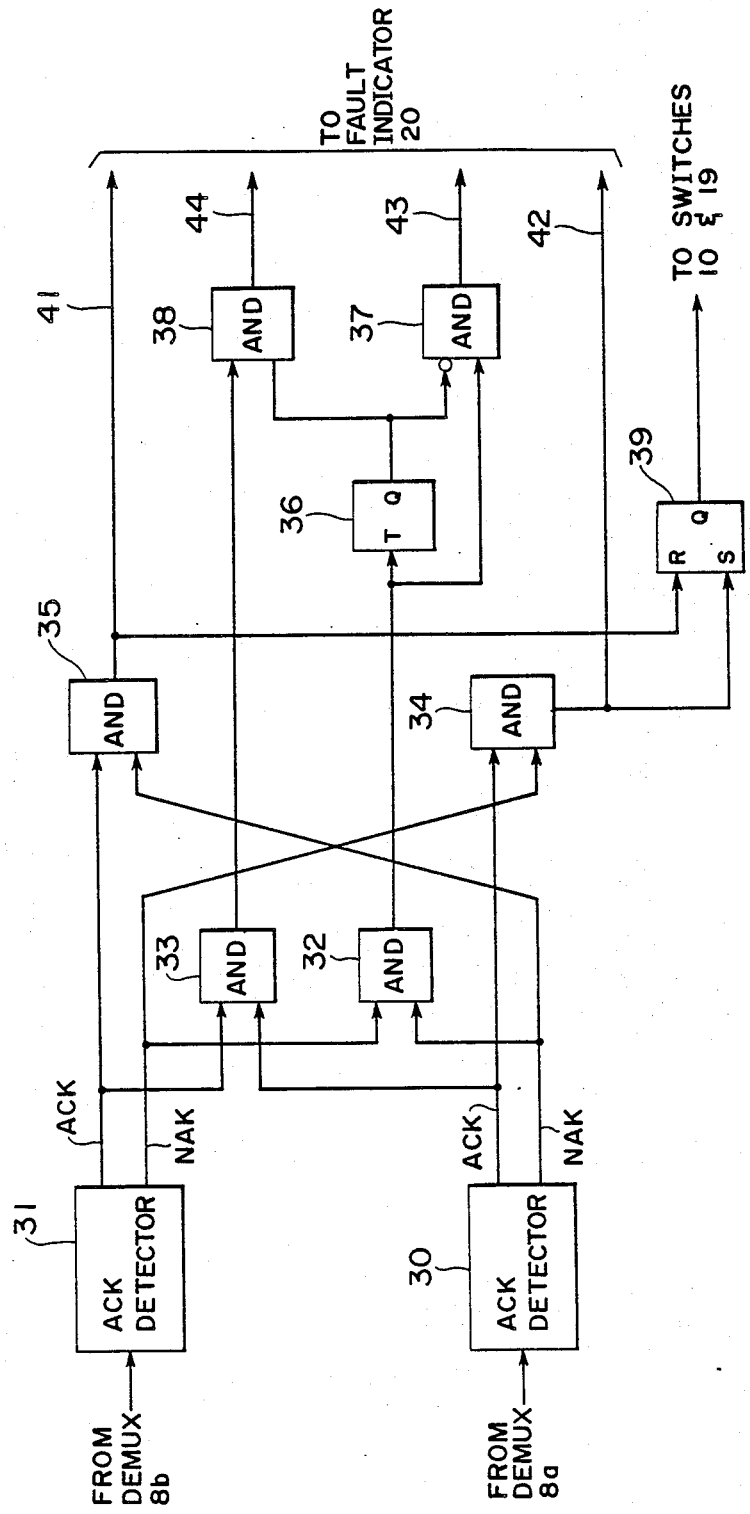
FIG. 3 is a block diagram illustrating the detail of the acknowledgment detection and fault identification circuit of FIG. 1.

In FIG. 3, the ACK detection and fault identification circuit 9 comprises a pair of identical acknowledgment detectors 30 and 31 which are connected respectively to the outputs of the demultiplexers 8a and 8b. Each of the ACK detectors generates an ACK signal indicating the presence of an acknowledgment signal or a NAK signal indicating the absence of acknowledgment signal. The ACK output of detector 30 is applied to a first input of AND gates 32 and 34 and the NAK output of detector 30 is applied to a first input of AND gates 32 and 35. The ACK output of detector 31 is connected a second input of AND gates 33 and 35 and the NAK output of detector 31 is connected to a second input of AND gates 32 and 34, as illustrated. The output of AND gate 32 is connected to the toggle input of a flip-flop 36 the output of which is applied to an inverted input of an AND gate 37 and a first input of an AND gate 38. AND gates 37 and 38 receive their second input from the output of AND gates 32 and 33, respectively. The outputs of AND gates 34, 35, 37 and 38 are connected to the fault indicator 20. A flip-flop 39 is provided having set and reset inputs coupled respectively to the output of AND gates 34 and 35 to provide a switching signal to the switches 10 and 19.

Initially, it is assumed that that the transmitting channel TA and receiving channel RB are active. Under this condition, flip-flop 39 is supplies a logic-1 output to switches 10 and 19. A polling signal is sent to a given terminal station through the active transmitting channel TA. If the active transmitting channel TA and the polled terminal station are normal, the polling signal will be received by the latter and an acknowledgment signal returned to the central station. If the active and hot-standby receiving channels are both normal, the transmitted acknowledgment signal will be detected by the ACK detectors 30 and 31, producing ACK outputs which are simultaneously fed to AND gate 33. While the AND gate 33 produces a logic-1 output, no logic-1 outputs are supplied to the fault indicator 20, giving an indication that no faulty conditions exist in any location of the system. Similar events occur when the transmitting channel TB and receiving channel RB are active and both of the active channels are normal.

If the ACK detector 30 produces an NAK output while the ACK detector 31 produces an ACK output, the AND gate 35 is activated, producing a logic-1 output on line 41 to indicate that a fault condition has occurred in the receiving channel RA. The logic-1 output of AND gate 35 resets the flip-flop 39, switching its output to logic-0 state. Thus, switches 10 and 19 will be caused to change their states, and transmitting and receiving channels TB and RB switched into active state. Conversely, if the ACK detectors 30 and 31 produce ACK and NAK outputs, respectively, the AND gte 34 will be activated, producing a logic-1 output on line 42 to the fault indicator 20 to indicate that the standby receiving channel RB is faulty. The logic-1 output from AND gate 34 is applied to the set input of flip-flop 39. Since the flip-flop 39 is generating a logic-1 output, no channel switching occurs.

If both ACK detectors produce an NAK output in response to the transmission of the polling signal to a given terminal station, AND gate 32 will be activated, causing the flip-flop 36 to produce a logic-1 output to disble the AND gate 37 and enable the AND gate 38. In a subsequent polling cycle, the next terminal station is polled. If an acknowledgment signal is not detected by both ACK detectors in the subsequent polling cycle, the AND gate 32 will produce a logic-1 output again and switches the flip-flop 36 to logic-0, causing the AND gate 37 to be enabled to pass the logic-1 output of AND gate 32 to an output line 43. Since the consecutive generation of logic-1 outputs from the AND gate 32 can be interpreted as representing a faulty condition in both channels of the central station, the logic-1 state on the output line 43 indicates that both channels of the central station are simultaneously faulty.

Conversely, if both ACK detectors produce an ACK output during the subsequent polling cycle, the AND gate 33 will be activated, producing a logic-1 output. Since AND gate 38 has been enabled by the logic-1 output of flip-flop 36 which is produced in the previous polling cycle, the logic-1 output of AND gate 33 is passed on line 44 to the fault indicator 20. Since the consecutive generation of logic-1 outputs from AND gates 32 and 33 in this order can be interpreted as representing a faulty condition in a terminal station polled in the first of successive polling cycles, the logic-1 state on the output line 44 indicates that a faulty condition exists in a polled station. Fault indicator 20 receives the polling signal that has been sent to the faulty terminal station to identify the faulty station polled in the previous polling cycle.

The foregoing description shows only one preferred embodiment of the present invention. Various modifications are apparent to those skilled in the art without departing from the scope of the present invention which is only limited by the appended claims.

What is claimed is:

1. A demand assignment time division multiple access communication system having a plurality of terminal stations and a central station, comprising:
    a pair of first and second time division multiplexed (TDM) transmitting channels for establishing a broadcast channel from said central station to said terminal stations and a pair of first and second TDM receiving channels for establishing individual channels from said terminal stations to said central station on an as needed basis, said first and second TDM receiving channels having inputs coupled together so that when one of the outputs of said receiving channels is coupled to a demultiplexer the other receiving channel is in a hot-standby state;
    a polling circuit for transmitting a polling signal on a common time slot of the broadcast channel for sequentially polling said terminal stations to permit each of the terminal stations to send an acknowledgement to said central station on a common time slot of the individual channels in response to said polling signal;
    a fault identification circuit connected to the outputs of said first and second receiving channels for detecting the presence and absence of said acknowledgment at said central station and detecting acknowledgments received through said first and second receiving channels for determining therefrom which one of said first and second receiving channels is faulty; and
    switch means responsive to the output of said fault identification circuit for selectively coupling the outputs of said first and second receiving channels to said demultiplexer.

2. A demand assignment time division multiple access communication system as claimed in claim 1, wherein said fault identification circuit comprises:
    first and second acknowledgment detectors connected respectively to the outputs of said first and second receiving channels to detect the presence and absence of acknowledgments; and
    a logic circuit connected to said first and second acknowledgment detectors for generating a switching signal to said switch means in response to the simultaneous detection of the presence and absence of an acknowledgment by said first and second acknowledgment detectors.

3. A demand assignment time division multiple access communication system as claimed in claim 2, wherein said fault identification circuit further comprises a second logic circuit responsive to the simultaneous detection of the presence of an acknowledgment by said first and second acknowledgment detectors and subsequently responsive to the simultaneous detection of the absence of an acknowledgment by said first and second acknowledgment detectors for indicating that one of the polled stations is faulty.

4. A demand assignment time division multiple access communication system as claimed in claim 6, wherein said fault identification circuit further comprises a second logic circuit responsive to the simultaneous detection of the absence of acknowledgment by said first and second acknowledgment detectors and subsequently responsie to the simultaneous detection of the absence of acknowledgment by said first and second acknowledgment detectors for indicating that said central station is faulty.

5. A demand assignment time division multiple access communication system as claimed in claim 3, wherein said fault identification circuit further comprises a third logic circuit responsive to the simultaneous detection of the absence of acknowledgment by said first and second acknowledgment detectors and subsequently responsive to the simultaneous detection of the absence of acknowledgment by said first and second acknowledgment detectors for indicating that said central station is faulty.

* * * * *